US007905970B2

(12) United States Patent
Day

(10) Patent No.: US 7,905,970 B2
(45) Date of Patent: *Mar. 15, 2011

(54) APPARATUS AND PROCESS FOR SEPARATION OF MULTI-STRAND ELASTICS

(75) Inventor: Victor Spencer Day, Greenville, TN (US)

(73) Assignee: The Moore Company, Westerly, RI (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/813,356

(22) PCT Filed: Dec. 27, 2005

(86) PCT No.: PCT/EP2005/014049
§ 371 (c)(1),
(2), (4) Date: Aug. 17, 2007

(87) PCT Pub. No.: WO2006/072431
PCT Pub. Date: Jul. 13, 2006

(65) Prior Publication Data
US 2008/0135671 A1 Jun. 12, 2008

Related U.S. Application Data

(60) Provisional application No. 60/641,769, filed on Jan. 7, 2005.

(51) Int. Cl.
*B32B 37/00* (2006.01)
(52) U.S. Cl. ......... 156/161; 156/163; 156/164; 156/229; 156/494; 156/495; 156/496

(58) Field of Classification Search .............. 156/160, 156/161, 163, 164, 229, 494, 495, 496
See application file for complete search history.

(56) References Cited

U.S. PATENT DOCUMENTS

| 4,626,305 | A | * | 12/1986 | Suzuki et al. | 156/164 |
| 4,762,582 | A | * | 8/1988 | de Jonckheere | 156/164 |
| 5,429,694 | A | * | 7/1995 | Herrmann | 156/164 |
| 5,500,075 | A | * | 3/1996 | Herrmann | 156/494 |
| 5,531,850 | A | * | 7/1996 | Herrmann | 156/161 |

(Continued)

FOREIGN PATENT DOCUMENTS
WO WO 0218125 3/2002

*Primary Examiner* — Jeff H Aftergut
(74) *Attorney, Agent, or Firm* — Sughrue Mion, PLLC

(57) ABSTRACT

An apparatus and method for separating a multi-strand elastic feed (1) comprising: an apparatus for separating a multi-strand elastic feed (1) comprising: a feed roll (2); a series of pins (3) for separating the feed located downstream from the feed roll said series extending laterally to the machine direction (9), the series comprising a first feed pin (4) and a subsequent set of separator pins (5); and wherein the spacing of the pins in the series is such that the separation of adjacent pins in the cross direction is less than the diameter of a separator pin, wherein in use, the multi-strand elastic feed is threaded manually around the feed pin and is then separated such that the strands pass around the separator pins in a direction opposite to that traveled round the feed pin with the result that the multi-strand elastic feed is separated into strands separated in the cross direction and a tensioning means to facilitate the initial threading of the feed around the pins; and a means for passing the separated strands directly for further processing (8) for incorporation into a laminate.

34 Claims, 3 Drawing Sheets

U.S. PATENT DOCUMENTS

| | | | |
|---|---|---|---|
| 5,660,664 A * | 8/1997 | Herrmann | 156/161 |
| 5,882,573 A | 3/1999 | Kwok et al. | |
| 5,902,540 A | 5/1999 | Kwok et al. | |
| 5,904,298 A | 5/1999 | Kwok et al. | |
| 6,049,956 A | 4/2000 | Lifke et al. | |
| 7,465,367 B2 * | 12/2008 | Day | 156/161 |
| 2004/0005835 A1 | 1/2004 | Zhou et al. | |
| 2006/0151092 A1 | 7/2006 | Day | |

* cited by examiner

APPARATUS AND PROCESS FOR SEPARATION OF MULTI-STRAND ELASTICS

The present invention relates to the separation of multi-strand elastic feeds such that they can subsequently be used in the production of multi-strand elastic laminates. The present invention provides an apparatus for such separation and a corresponding process of separation. The multi-strand elastic laminates produced are suitable for use in various applications including in adult and infant disposable products and medical articles such as bandages.

In the field of manufacturing disposable products, in particular diapers, there is significant interest in the production of multi-layer laminates which have as a central layer, an elastic material and then outer non-woven layers. Such laminates have the advantage of combining the soft feel and breathable nature of a non-woven material with the elastic properties of the elastic layer. Often it is desirable to include various strands of elastic between the sandwiching layers rather than a continuous wide elastic layer. This enables a greater control of the elasticity of the final product.

Conventionally such strands of elastic have been applied in multi-layer laminates by using a number of spools or reels. Typically the elastic material used is Spandex or Lycra. Alternative materials include Fulflex Synthetic Polyisoprene System 7000 (Trade Mark) and Comfi-Fit (Registered Trade Mark). This material can be purchased pre-wound onto a spool. These materials are arranged as appropriate in the machinery and then unwound via an unwinder such that each spool provides a single strand source of elastic material which can then be applied as required. It is therefore necessary to have a separate spool for each strand of elastic required. A similar technique is used in the textiles industry. It can be envisaged that where a large number of feeds are required, the size of the machinery becomes larger and the process can become very complicated when attempts are made to reduce the spacing between separate strands.

As an alternative to using the strands as the starting material, it is possible to obtain multi-strand elastic starting material. In order to produce such materials, a rubber product is calendered, vulcanized, slit and then repackaged by bringing the separated strands into contact again. The result is a preslit product which can then be easily separated.

An established technique used in the textiles industry employs a leasing mechanism. In such a method, the feed is firstly placed under tension. This causes the preslit threads to separate and they are then thread alternatively up and down over a glass rod which has a low coefficient of friction at the splitting point. This produces two separated feeds of elastic which can then be further separated or the spacing altered by use of a comb mechanism prior to passing the strands for further processing in the textiles industry. A disadvantage associated with such a technique is that the threading of the multi-strand feed above and below the glass rod is time consuming and perhaps more importantly, it is difficult to use this method where the separated strands are required to be closely spaced.

It is therefore clear that there is a need for a process for separation of a multi-strand elastic feed which can be carried out on-line quickly and efficiently and also facilitates the provision of a source of closely spaced elastic strands for subsequent incorporation into a laminate.

In this regard, the present invention provides an apparatus for separating a multi-strand elastic feed comprising
a feed roll;
a series of pins for separating the feed located downstream from the feed roll said series extending laterally to the machine direction, the series comprising a first feed pin and a subsequent set of separator pins; and
wherein the spacing of the pins in each series is such that the separation of adjacent pins in the cross direction is less than the diameter of a separator pin, wherein, in use, the multi-stand elastic feed is threaded manually around the feed pin and is then separated such that the strands pass around each separator pin in a direction opposite to that traveled around the feed pin with the result that the multi-strand elastic feed is separated into strands separated in the cross direction;
a tensioning means to facilitate the initial threading of the feed around the pins; and
a means for passing the separated strands directly for further processing for incorporation into a laminate.

The present invention further provides a process for separating a multi-strand elastic feed which comprises the steps of:
providing a multi-strand elastic feed;
feeding the multi-strand elastic feed onto a feed roll
imparting a tension to the multi-strand elastic feed;
manually feeding the multi-strand elastic feed under tension to a series of pins located downstream from the feed roll, said series extending laterally to the machine direction, the series comprising a feed pin and a subsequent set of separator pins and wherein the spacing of the pins in each series is such that the distance in the cross direction between adjacent pins is less than the diameter of a separator pin;
wherein the multi-strand elastic is threaded manually around the feed pin and then split such that the strands pass around each subsequent pin in the series in the opposite direction to that traveled around the feed pin and the coefficient of friction of the surface of the pins is sufficiently low that the multistrand elastic passes freely around the pins with the result that the multi-strand elastic feed is split into strands separated in the cross direction; and
passing the separated strands directly for further processing for incorporation into a laminate.

The term "multi-strand elastic" refers to a preslit collection of rubber strands which are bonded together to form a ribbon by virtue of the tackiness of the slit rubber. Upon application of a stretching force, the adhesion between the contacting surfaces of adjacent strands is reduced and the strands separate. Such a multi-strand elastic is formed by calendering, vulcanizing, slitting and then repackaging a rubber product. The multi-strand elastic feed of the present invention may be any natural or synthetic multi-strand elastic. Suitable elastic materials include both natural and synthetic rubber, polyisoprenes, styrene butadiene rubbers, nitrile rubbers, polychloroprene and styrenic block copolymers such as Kraton Polymers™. A particularly preferred multi-strand elastic for use in the present invention is Synthetic Polyisoprene Series 7000 available from Fulflex or Comfi-fit (TM, Fulflex). The number of strands included in the multi-strand elastic is not limited and may range from 2 to 950 but is preferably at least 4 and typically in the range from 10 to 70. The width of the individual strands which make up the multi-strand elastic feed is typically in the range from 0.25 mm to 1.0 mm, preferably 0.25 to 0.5 mm and these strands have a corresponding thickness in the range from 0.4 mm to 0.8 mm, preferably in the range from 0.15 mm to 0.5 mm.

After being fed onto the feed roll of the apparatus, which is typically a nip roll, the multi-strand elastic feed is tensioned. The tension force causes the individual strands of elastic which make up the feed to separate from each other. Such a tensioning force is required to facilitate the manual threading of the feed around the pins. The tensioning force imparted is generally sufficient to give a stretch of up to 400%, more preferably in the range from 200 to 300%.

Preferably the speed of the in feed roller is in the range from 50 to 400 m per minute. This depends on the line speed and on the degree of stretch required. Typical line speeds are in the range from 200 to 500 m/min or even more, for example 400 to 600 m/min. The speed of the line, however, is not a limiting factor in the process of separating the multi-strand elastic feed. The size of the tensioning force applied also depends on the degree to which the strands are to be stretched before incorporation into a laminate. In the situation where the stretching required is less than the tensioning force, prior to incorporation into the final laminate, the strands may be relaxed. Where the stretching required exceeds the tensioning force, it may be necessary to include a separate stretching means. As such, the apparatus may include a tensioning means and a stretching means. However, in a preferred embodiment, the tensioning and stretching means are the same piece of apparatus. In the embodiment where the apparatus includes a stretching means, the stretching force is applied between the feed roll and the means for passing the separated strands for further processing for incorporation into a laminate. The stretching force imparted is sufficient to give a total stretch in the range from 50 to 600%, more preferably 300 to 400%. The tensioning means and stretching means are not limited. In one embodiment of the present invention, the stretching force is provided by including a second nip roller downstream of a the feed roller and separating pins.

Once the multi-strand elastic has been placed under tension it is fed to the series of pins. When first initiating a run, it is necessary to thread the multistrand elastic material around the pins manually. The series of pins extends laterally to the machine direction. The pins are usually fixed whereby they do not rotate. Generally they are fixed and do not move during the carrying out of the method or between operations, in the machine or cross-directions. The pins are preferably formed from ceramic or glass and have a low coefficient of friction such that the multi-strand elastic feed can pass around them smoothly without being hindered or exerting an excessive force on the pins.

The first pin of the series is a feed pin. The series then comprises a subsequent set of separator pins. The first separator pin in each series is preferably aligned in the cross direction with the feed pin but it may have its axis slightly downstream or upstream from the axis of the feed pin.

By arranging the pins in this manner, the separation of the pins in the cross direction can be minimised. The separation of adjacent separator pins in the cross direction is less than the diameter of the pins. Generally adjacent pins should be spaced from one another so as to avoid snagging of the elastic e.g. to leave a space of at least 0.7 mm, preferably 1 mm, and more preferably at least 2 mm to facilitate threading. The spacing of adjacent pins is additionally determined by the width of the multi-strand elastic to be used. The spacing should be sufficiently wide to allow product splices or knots to pass through. The diameter of the separator pins is preferably in the range from 5 to 10 mm. Such a diameter is appropriate in order to ensure that the pins do not break when subjected to the pressure of the strands passing around them under tension and, more importantly, to prevent damage during assembly and use by operators. Preferably the diameter of the feed pin in each series is greater than the diameter of the other pins. Preferably the diameter of the feed pin is in the range from 0.85 to 1.10 cm. This is because the pressure exerted on these central pins is greater than the pressure exerted on the subsequent separator pins.

In a preferred embodiment of the present invention the set of separator pins are arranged at regularly spaced intervals along a line that projects at an angle of from −180 to +180° to the machine direction. Preferably the line is a straight line.

In one embodiment of the present invention, the series of pins comprises two arrays of pins arranged symmetrically about an axis parallel to the machine direction wherein the feed pin in each array lies closest to the axis. In such an embodiment, preferably the subsequent set of separator pins are arranged at regularly spaced intervals along a line wherein the first line of separator pins extends at an angle of between 90 to 180° to the axis and the second line of separator pins projects at an angle of −90° to −180° to the axis. In general, the closer the angle of the line of separator pins is to 180°, the closer the separated strands will be, with minimal distance between adjacent pins. Preferably the first line of separator pins projects at an angle of approximately 160° to the axis and the second line of separator pins projects at an angle of −160°.

In use, the multi-strand elastic feed is fed around the feed pins in the series. Where the series of pins comprises two arrays, a fraction of the feed will pass around one feed pin and the remaining fraction around the other feed pin. The strands are then separated such that the strands of elastic which make up the multi-strand elastic feed pass around each separator pin in the series. The strands pass around the separator pins in a direction which is opposite to the direction traveled around the respective feed pins. The path length of the different strands will be higher for the strands located at the edges of the original feed due to the geometry of the series of pins. The multi-strand elastic passes through the series of pins with the result that the multi-strand elastic feed is split into strands separated in the cross direction. In one embodiment, only a single strand passes around each subsequent separator pin in the set. It can be further envisaged that, depending on the nature of the final laminate to be produced, it is desirable to develop a pattern of strands whereby several strands are fed around the same separator pin. The apparatus may further include another separating means downstream of the means for passing the separated strands for further processing. An example of such a means is a comb, pulley or guide.

The spacing between the strands as they leave the series of pins is preferably in the range from 2 mm to 10 mm. This spacing may be further adjusted downstream. By virtue of the present invention it is also possible to obtain a very close strand spacing in the range from 2.5 mm to 3.0 mm. The strand spacing as referred to herein is the spacing between the centres of adjacent strands. By producing closely spaced strands it is possible to ultimately produce a comparatively flat product without the need to use a continuous elastic layer. The closer the spacing, the smaller the gathers in the end product which gives products a flatter appearance. Furthermore, by controlling the spacing pattern of the strands, it is possible to produce shaped and contoured products such as those designed to fit body parts such as knees, elbows and other joints. Such contouring can improve product comfort characteristics, especially when made with Fulflex System 7000™ and Fulflex Comfi-Fit (Registered Trade Mark) elastic.

As detailed above, the apparatus of the present invention may include more than one series of separating pins and the number of pins in each array can be in the range from 2 to 40. In a preferred embodiment, four series are present and one feed of multi-strand elastic is fed to each of these series, each feed comprising 15 to 20 strands. The total number of series of separating pins included is determined by the width of the final laminate required and the machine width availability.

This apparatus is included on-line. The term "on-line" refers to the fact that the separated strands are passed directly for further processing without any intermediate reeling up. Thus the separated elastic strands can then be passed directly to the next stage of processing wherein they are incorporated into a laminate. The next stage in the process can vary significantly depending on the end application for which the laminate into which are incorporated is to be used. For example, the further processing may include subsequent stretching steps prior to the incorporation of the elastic strands into an elastic laminate.

In one embodiment of the present invention, in order to incorporate the separated elastic strands into an elastic laminate they are first coated with an adhesive. This can be done by use of an adhesive system which applies adhesive by means of the strand-coat method in which each strand is coated with adhesive. Alternatively the traditional methods of slot coating and spiral coating may be employed. The adhesive used is preferably a hot melt adhesive and is applied in amount so as to give a coat weight in the range from 5 mg/m/strand to 40 mg/m/strand. The coated elastic strands can then be sandwiched between the other layers of material that are to make up the elastic laminate whereby they are adhered to such layers. In one embodiment of the present invention, the other materials may be non-woven layers.

The resulting laminates formed have a high extensibility in the range from 50 to 600%. Preferably in the range from 250 to 400, more preferably approximately 350%. As such these laminates are suitable for various end applications, in particular in both disposable and re-usable products. Where the multiple strands of elastic are sandwiched between non-woven material layers, a breathable non-woven elastic laminate is obtained. These laminates may be used in, for example, the side panels, stomach panels, waistband and fastening tabs of adult and infant disposables such as diapers. Additionally, the laminates may be used in the preparation of both reusable and disposable bandages or similar materials.

The apparatus of the present invention can easily be incorporated into existing manufacturing lines and allows for a continuous separation of the multi-strand elastic feed materials avoiding the need to replace spools as has been required previously.

FIGURES

Figure 1:
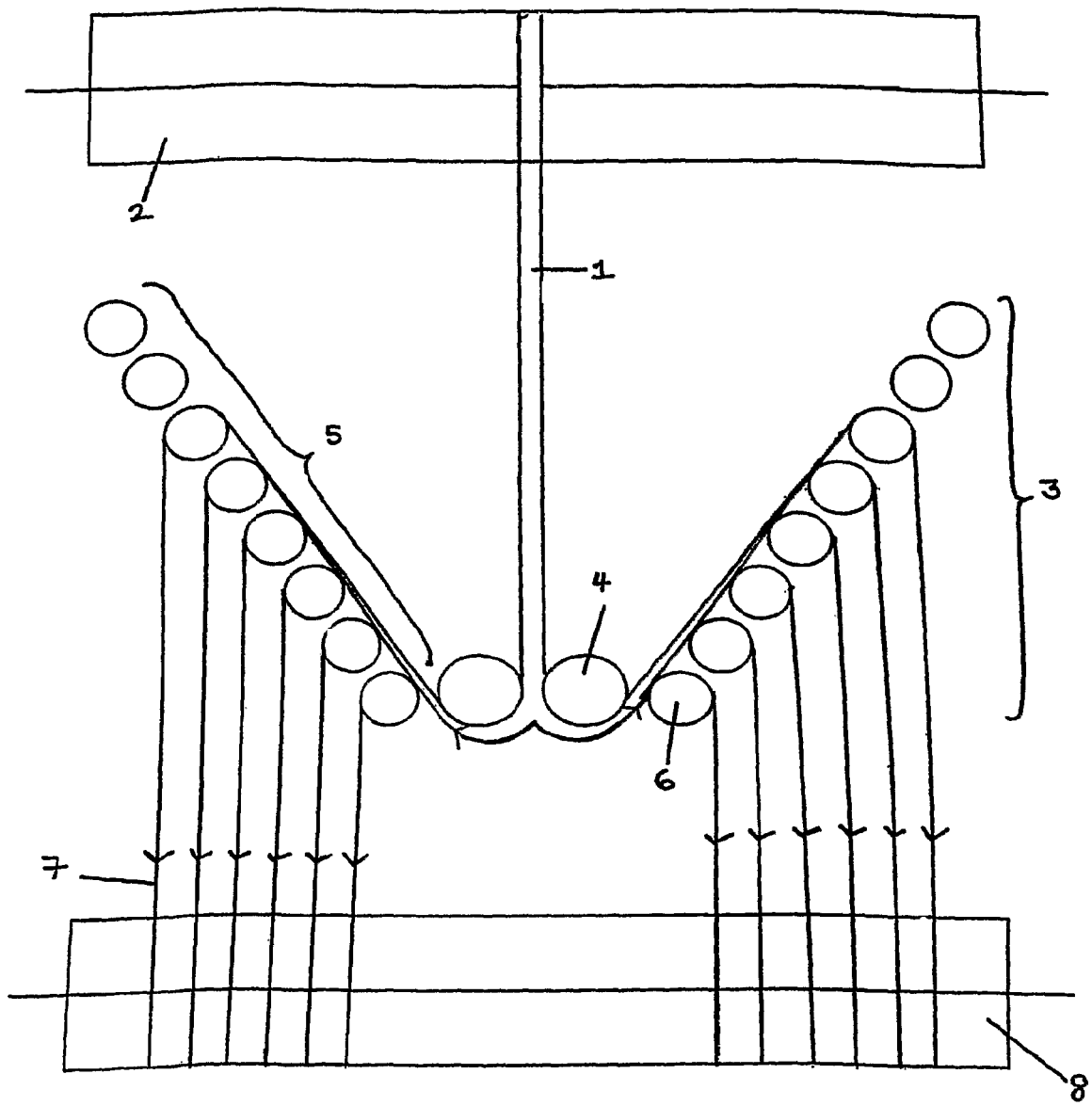
FIG. 1 is a schematic representation of the apparatus of a preferred embodiment of the present invention as viewed from above.
Figure 2:
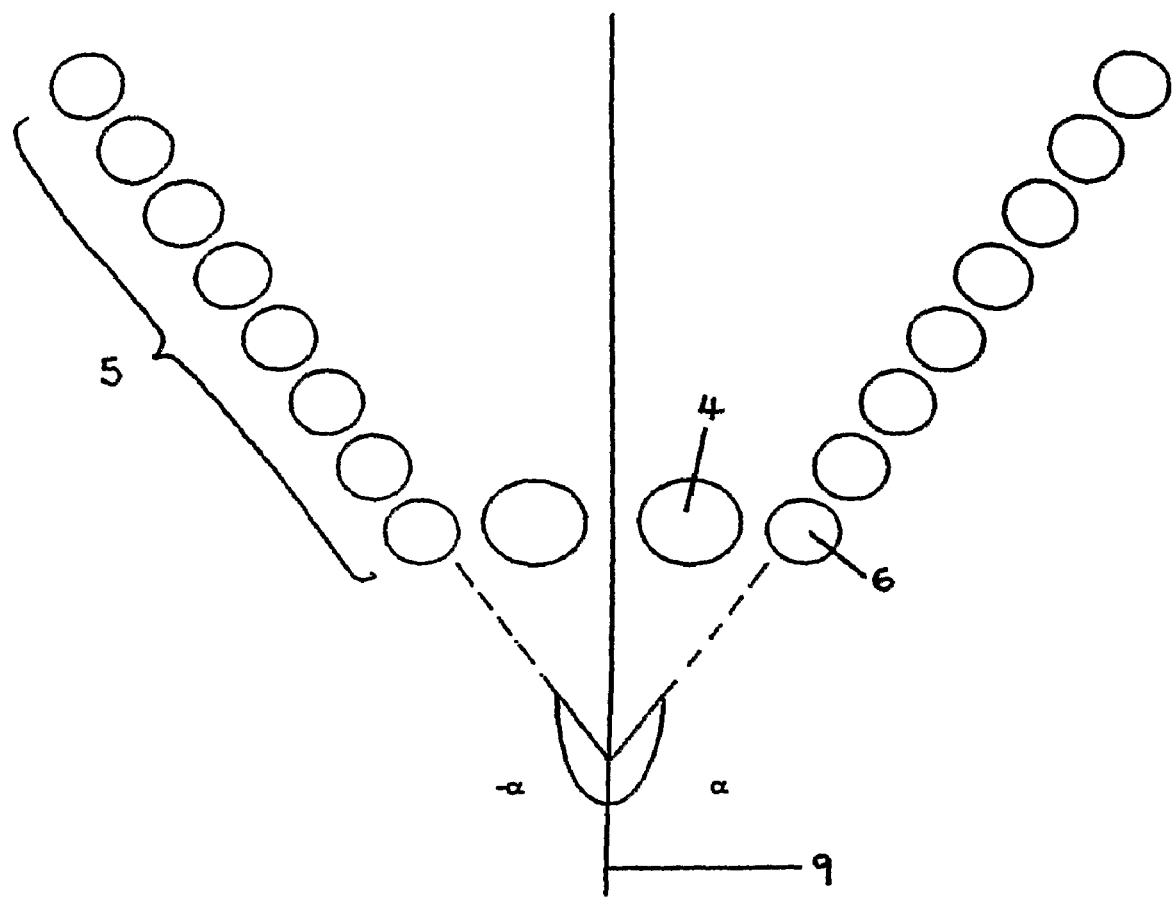
FIG. 2 is a schematic representation of the array of separating pins.

In FIG. 1 the multi-strand elastic feed (1) is fed by a feed roll (2) to the series of separator pins (3). As illustrated in the FIG. 2 the pins which make up the series are arranged in a symmetrical fashion about an axis parallel to the machine direction (9). The series of separator pins comprises two arrays wherein each array comprises a feed pin (4) and a subsequent set of separator pins (5).

The separator pins (5) are arranged at regularly spaced intervals along a line. The first line of separator pins projects at an angle (α) of between 90° and 180° to the axis (9) and the second line of separator pins projects at an angle (−α) of between −90° and −180° to the axis (9).

The first separator pin (6) in each line is aligned in the cross direction with the feed pin (4) of each array. A tension of 200% to 300% is applied and then half of the multi-strand elastic feed (1) is fed around each of the feed pins respectively and then threaded manually around each of the subsequent pins in the two arrays respectively, in a direction opposite to the direction threaded around the respective feed pin (4). The result is that the multi-strand elastic feed is separated into strands (7). The separated strands are then passed to a means for passing them for further processing for incorporation into a laminate, in this case, a tensioning roll (8). It is this tensioning roll (8) which additionally provides the required stretching force to give a total stretch in the range from 300 to 400%.

Figure 3:
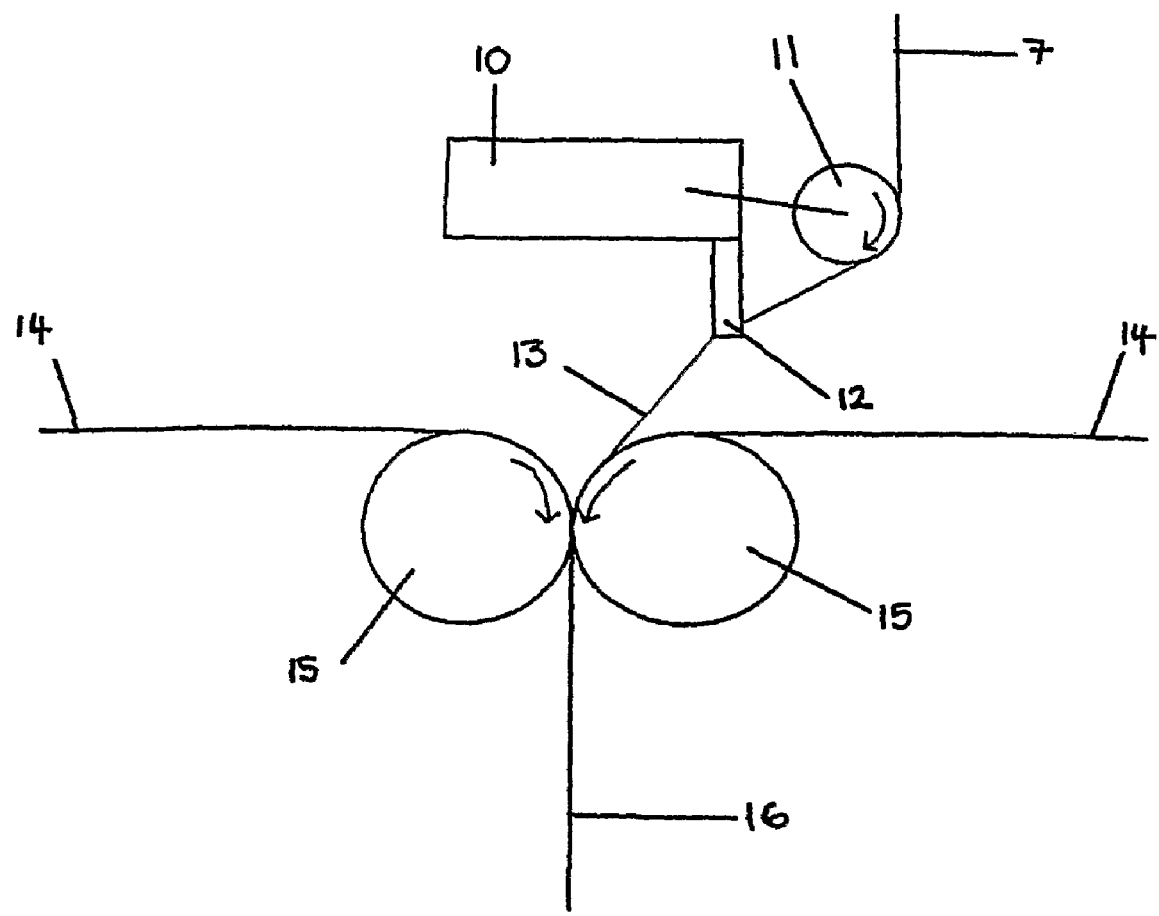
FIG. 3 is a schematic representation of the separated elastic strands being adhered between two layers of non-woven material to form a multi-strand elastic laminate.

As illustrated in FIG. 3, the separated strands (7) can then be coated with adhesive by means of an adhesive system (10) which comprises a grooved roller (11) and a comb (12). The adhesive coated strands (13) are then guided between two feeds of non-woven material (14) and a pressure is exerted by two rollers (15). The product obtained is an elastic laminate (16). The present invention will now be further described by reference to a specific example. This example is in no way intended to limited the scope of protection.

EXAMPLE 1

The multi-strand elastic, Fulflex Synthetic Polyisoprene System 7000, commercially available from Fulflex Inc was fed to a nip roller. The multi-strand elastic material comprised 20 preslit individual strands of elastic. Each strand had a thickness of 0.3 mm and a width of 0.48 mm. The speed of the nip roller was 300 m/min (1000 ft per min). By virtue of a second nip roller located downstream of the separating pins, the multi-strand elastic material was subjected to a stretching force of 300%. This caused the individual strands to separate such that they could be threaded around the array of pins.

In this example, the series of pins included 28 pins in total. The pins were arranged in two arrays symmetrically about an axis parallel to the machine direction. Each array included a feed pin and 12 separator pins. The 12 separator pins in each array were arranged in a regularly spaced line in the plane of the feed wherein the first line of separator pins were at an angle of approximately 160° to the machine direction and the second line of pins were at an angle of approximately −160° to the machine direction. The feed pin of each series had a diameter of 0.95 cm (⅜ inch) and the separator pins had a diameter of 0.64 cm (¼ inch). The arrangement of pins is shown schematically in FIG. 3. The multi-strand elastic feed was fed to the series of pins long the axis about which the pins are arranged symmetrically. The feed was then divided in half with each half being threaded manually around the feed pin of each series. Individual strands were then wound round each subsequent separator pin in each array. The feed leaving the separating series of pins comprised 20 strands of elastic, 10 on each side, each running parallel to one another. The separation between the strands leaving the series of pins was in the range from 2 to 10 mm and the spacing and strand pattern were further adjusted downstream by means of combs, pulleys and guides to give a final spacing of 2.5 mm prior to incorporation into a laminate.

The separated strands were then passed via a nip roller to an adhesive system. Here the individual strands were coated with a hot melt adhesive to give a coat weight of approximately 20 mg/m/strand. The adhesive coated elastic strands were then sandwiched between two feeds of non-woven material as shown in FIG. 4 to produce a multistrand elastic laminate.

The multistrand elastic laminate produced can then, for example, be incorporated into a diaper.

The invention claimed is:

1. A process for separating a multi-strand elastic feed comprising:
   a) providing a multi-strand elastic feed (1);
   b) feeding the multi-strand elastic feed onto a feed roll (2);
   c) imparting a tension to the multi-strand elastic feed;
   d) manually feeding the multi-strand elastic feed under tension to a series of pins (3) located downstream from the feed roll, said series extending laterally to the machine direction, the series comprising a first feed pin (4) and a subsequent set of separator pins (5) and wherein the spacing of the pins in the series is such that the distance in the cross direction between adjacent pins is less than the diameter of a separator pin;
   wherein the multi-strand elastic is threaded manually around the feed pin and then split such that strands pass around each subsequent pin in the series in the opposite direction to that traveled around the feed pin and the coefficient of friction of the surface of the pins is sufficiently low that the multi-strand elastic passes freely around the pins with the result that the multi-strand elastic feed is split into strands separated in the cross direction; and
   e) passing the separated strands directly for further processing to incorporate into a laminate.

2. The process according to claim 1, wherein the tension imparted in step (c) is sufficient to give a stretch of up to 400%.

3. The process according to claim 1, wherein the tension imparted in step (c) is sufficient to give a stretch in the range from 200 to 300%.

4. The process according to claim 1, which includes a further step wherein a stretch in the range from 50 to 600% is imparted to the multi-strand elastic feed.

5. The process according to claim 1, wherein the first separator pin (6) in each set is aligned in the cross direction with the feed pin.

6. The process according to claim 1, wherein the stretch imparted in step c) is approximately 300%.

7. The process according to claim 1, wherein the pins are made from glass or ceramic.

8. The process of claim 1, wherein the separator pins are arranged at regularly spaced intervals along a line that projects at an angle in the range from −180° to +180° of the machine direction.

9. The process of claim 1, wherein the series of pins comprises two arrays of pins arranged symmetrically about an axis parallel to the machine direction.

10. The process of claim 1, wherein the series of pins comprises two arrays of pins arranged symmetrically about an axis parallel to the machine direction wherein the feed pin in each array lies closes to the axis and the subsequent set of separator pins are arranged at regularly spaced intervals along a line wherein the first line of separator pins projects at an angle of between 90 to 180° to the axis and the second line of separator pins projects at an angle of between −90° to −180° to the axis.

11. The process according to claim 8, wherein the first line of separator pins projects at an angle of 160° to the axis and the second line of separator pins projects at an angle of −160° to the axis.

12. The process according to claim 1, wherein the diameter of the separator pins is in the range from 0.5 to 0.7 cm.

13. The process according to claim 1, wherein the diameter of the feed pins is in the range from 0.85 to 1.10 cm.

14. The process according to claim 1, wherein in step e), the separated strands are passed via a nip roll for further processing into laminates.

15. The process according to claim 1, wherein after step (e), the separated strands are subjected to a further separation step.

16. The process according to claim 1, wherein in step e) the separated strands are coated with adhesive.

17. The process according to claim 1, wherein the multi-strand elastic feed is separated into strands separated in the cross-direction by a distance in the range from 2 to 10 mm.

18. The process according to claim 1, wherein the single strands are separated in the cross direction by a distance in the range from 2.5 to 3.0 mm.

19. An apparatus for separating a multi-strand elastic feed (1) comprising:
   a feed roll (2);
   a series of pins (3) for separating the feed located downstream from the feed roll said series extending laterally to the machine direction (9), the series comprising a first feed pin (4) and a subsequent set of separator pins (5); and wherein the spacing of the pins in the series is such that the separation of adjacent pins in the cross direction is less than the diameter of a separator pin, wherein in use, the multi-strand elastic feed is threaded manually around the feed pin and is then separated such that the strands pass around the separator pins in a direction opposite to that traveled around the feed pin with the result that the multi-strand elastic feed is separated into strands separated in the cross direction; and
   a tensioning means to facilitate the initial threading of the feed around the pins; and
   a means for passing the separated strands directly for further processing (8) for incorporation into a laminate.

20. The apparatus for claim 19, wherein the tensioning means imparts a tensioning force sufficient to give a stretch of up to 400%.

21. The apparatus of claim 19, wherein the tensioning means imparts a tensioning force sufficient to give a stretch in the range from 200 to 300%.

22. The apparatus of claim 19 which further includes a stretching means to stretch the multistrand elastic feed between the feed roll and means for passing the separated strands for further processing to a length in the range from 50 to 600% of its unextended length.

23. The apparatus of claim 22, wherein the tensioning means and stretching means are the same piece of apparatus.

24. The apparatus of claim 19, wherein the first pin in the set of separator pins (6) is aligned in the cross direction with the feed pin.

25. The apparatus of claim 19, wherein the tensioning means is a nip roll located downstream of the series of pins.

26. The apparatus of claim 19, wherein the stretching means is a nip roll located downstream of the series of pins.

27. The apparatus of claim 19, wherein the pins are glass or ceramic.

28. The apparatus of claim 19, wherein the diameter of the separator pins is in the range from 0.5 to 0.7 cm.

29. The apparatus of claim 19, wherein the series of pins comprises two arrays of pins arranged symmetrically about an axis parallel to the machine direction.

30. The apparatus of claim 19, wherein the set of separator pins are arranged at regularly spaced intervals along a line that projects an angle in the range from −180° to +180° to the machine direction.

31. The apparatus of claim 19, wherein the series of pins comprises two arrays of pins arranged symmetrically about an axis that is parallel to the machine direction, wherein the feed pin in each array lies closes to the axis and the subsequent set of separator pins are arranged at regularly spaced intervals along a line wherein the first line of separator pins projects at an angle of between 90° to 180° to the axis and the second line of separator pins projects at an angle of between −90° to −180° to the axis.

32. The apparatus of claim 31, wherein the first line of separator pins projects at an angle of 160° to the axis and the second line of separator pins projects at an angle of −160° to the axis.

33. The apparatus of claim 27, wherein the first and second lines of separator pins are straight lines.

34. The apparatus of claim 19, wherein the multi-strand elastic feed is separated into strands separated in the cross-direction by a distance in the range from 2 to 10 mm.

* * * * *